(12) United States Patent
Hamiti et al.

(10) Patent No.: US 11,108,291 B2
(45) Date of Patent: Aug. 31, 2021

(54) FLANGE FOR AN ELECTRICAL MACHINE

(71) Applicant: INSTITUT VEDECOM, Versailles (FR)

(72) Inventors: Tahar Hamiti, Montigny le Bretonneux (FR); Guy Diemusch, Fontaine (FR); Dominique Lhotellier, Ville d'Avray (FR)

(73) Assignee: INSTITUT VEDECOM, Versailles (FR)

( * ) Notice: Subject to any disclaimer, the term of this patent is extended or adjusted under 35 U.S.C. 154(b) by 402 days.

(21) Appl. No.: 16/301,320

(22) PCT Filed: May 9, 2017

(86) PCT No.: PCT/FR2017/051105
§ 371 (c)(1),
(2) Date: Nov. 13, 2018

(87) PCT Pub. No.: WO2017/194872
PCT Pub. Date: Nov. 16, 2017

(65) Prior Publication Data
US 2019/0207457 A1    Jul. 4, 2019

(30) Foreign Application Priority Data

May 13, 2016  (FR) ...................................... 1654310

(51) Int. Cl.
*H02K 3/24* (2006.01)
*H02K 1/20* (2006.01)
(Continued)

(52) U.S. Cl.
CPC ................. *H02K 3/24* (2013.01); *H02K 1/20* (2013.01); *H02K 5/20* (2013.01); *H02K 9/197* (2013.01); *H02K 3/522* (2013.01)

(58) Field of Classification Search
CPC ........... H02K 1/20; H02K 3/24; H02K 3/522; H02K 5/20; H02K 9/197
See application file for complete search history.

(56) References Cited

U.S. PATENT DOCUMENTS 10,097,066 B2 *  10/2018  Hanumalagutti ........ H02K 5/15
10,536,055 B2 *   1/2020  Hanumalagutti ........ H02K 9/00
(Continued)

FOREIGN PATENT DOCUMENTS

EP        1680855 B1     3/2007
EP        2242164 A1    10/2010
(Continued)

OTHER PUBLICATIONS

International Search Report for corresponding PCT/FR2017/051105, dated Jun. 28, 2017.
(Continued)

*Primary Examiner* — Bernard Rojas
(74) *Attorney, Agent, or Firm* — Sandberg Phoenix & von Gontard, P.C.

(57) ABSTRACT

The invention relates to a flange (1) for an electrical machine (100), said flange being configured to at least partially cover winding overhangs (10) that form part of the electrical machine (100), the flange (1) comprising a chamber (5) able to receive a cooling fluid, characterized in that the flange (1) comprises at least one first orifice and at least one second orifice allowing cooling fluid to enter the chamber (5) or allowing cooling fluid to leave the chamber (5), said chamber (5) having a profile that compliments that of at least one winding overhang (10). Said invention is applicable to motor vehicles.

14 Claims, 7 Drawing Sheets

(51) Int. Cl.
*H02K 5/20* (2006.01)
*H02K 9/197* (2006.01)
*H02K 3/52* (2006.01)

(56) References Cited

U.S. PATENT DOCUMENTS

| | | | | |
|---|---|---|---|---|
| 2001/0045125 | A1* | 11/2001 | Alexander | G01N 29/265 |
| | | | | 73/146 |
| 2002/0167232 | A1* | 11/2002 | Randall | H02K 9/22 |
| | | | | 310/54 |
| 2007/0035187 | A1* | 2/2007 | Verhaegen | H02K 3/24 |
| | | | | 310/59 |
| 2011/0215660 | A1* | 9/2011 | Goto | H02K 3/522 |
| | | | | 310/53 |

FOREIGN PATENT DOCUMENTS

| | | |
|---|---|---|
| JP | 2000316245 A | 11/2000 |
| JP | 2005261084 A | 9/2005 |
| WO | 2010058284 A2 | 5/2010 |

OTHER PUBLICATIONS

Written Opinion or corresponding PCT/FR2017/051105, dated Jun. 28, 2017.

* cited by examiner

FLANGE FOR AN ELECTRICAL MACHINE

CROSS-REFERENCE TO RELATED APPLICATIONS

This application is the US National Stage under 35 USC § 371 of International App. No. PCT/FR2017/051105, which claims priority to French application 1654310 filed on May 13, 2016, the content (text, drawings and claims) of which is incorporated here by reference.

BACKGROUND

The field of the present invention is that of electrical machines, preferably rotating machines, such as generators or motors. More specifically, these electrical machines are intended to be installed in vehicles, in particular automobiles, such as, for example, road vehicles or trains.

Rotating electrical machines, such as generators or motors, comprise a stator and a rotor. Windings forming coils are arranged on the stator and permanent magnets are secured to the rotor. The rotor is rotatable by means of a shaft. When the electrical machine is a generator, the rotational motion of the rotor in front of the coils of the stator provides for the generation of electrical energy and when the electrical machine is a motor, the start-up of rotation of the rotor generates mechanical energy.

In the case in which these electrical machines are used to set the vehicle in motion, it is advisable to minimize the weight of all onboard elements on the vehicle since this weight directly impacts the range of the electric source tasked with powering the electrical propulsion machine of the vehicle. This search for weight reduction results in an optimization of the compactness of this electrical machine, while at the same time retaining the same level of performance.

This situation leads to an increase of the heat produced by the electrical machine. It is therefore advisable to cool it down to avoid overheating which could result in a reduction of performance, a failure of some components of the electrical machine, or even the destruction of the same.

Among the components to be cooled down, the coils, and more specifically the winding overhangs, are critical elements, which determine the magnitude of the general performance of the electrical machine. When consideration is given to this reduction in the dimensions of the electrical machine, it becomes particularly difficult to cool down the winding overhangs effectively.

SUMMARY

This technical problem is solved by means of a flange for electrical machines which offers a specific cooling down of the winding overhangs, while also remaining particularly compact.

A flange for electrical machines is disclosed that is configured to at least partially cover winding overhangs belonging to the electrical machine, the flange comprising a chamber able to receive a cooling fluid. The flange comprises at least one first orifice and at least one second orifice allowing cooling fluid to enter the chamber or allowing cooling fluid to leave the chamber, said chamber having a profile complementary to that of at least one winding overhang.

The flange thereby enables a specific cooling of the winding overhangs by allowing cooling fluid to come as close as possible to the winding overhangs. Such a cooling allows for an increase in the performance of the electrical machine, while at the same time, it ensures a footprint and a weight that do not place a burden on the range of the electric source that can outfit the vehicle. A complementary profile is when the shape of the walls that constitute the chamber follows at least in part the shape lines shown by the winding overhangs.

According to the different features of the flange, when taken alone or in combination, it is possible to provide that:
- the chamber is configured to be leakproof as regards the winding overhangs,
- the first orifices lead into the chamber,
- the second orifices lead into the chamber,
- the first orifices are formed on an outside cylindrical face of the flange, called the peripheral face of the flange,
- the second orifices are formed on an inner face of the flange which extends radially,
- a wall that at least partially delineates the chamber and is intended to be in contact with the winding overhangs is continuous. By this, it is understood that this wall is not interrupted by orifices which would end up in the winding overhangs reception area. This assures the sealing of the chamber as regards the winding overhangs.
- the flange comprises a reception area intended to receive a rotating bearing of the electrical machine.
- the chamber is entirely delineated by the flange, by the first orifice and the second orifice,
- the flange comprises a separating plate that divides the flange between an outer part and an inner part, said separating plate also dividing the chamber into an outer chamber located on the outer part and an inner chamber located on the inner part,
- the separating plate extends radially and towards the outside of the flange beyond a peripheral face that defines the limits of the outer part and the inner part,
- the separating plate comprises at least one slit allowing communication between the outer chamber and the inner chamber,
- the inner chamber has a profile that is complementary to that of at least one winding overhang,
- the inner chamber has a U-shaped section. In this manner, it is assured that at least three faces of the winding overhang will be cooled down. This U-shaped section being visible according to a longitudinal cross-section of the flange.
- the flange comprises a plurality of first and second orifices allowing the cooling fluid to enter and leave the chamber, the orifices leading to a peripheral face of the flange. The chamber can thereby comprise many inlets and many outlets depending on the flow rate of cooling fluid that is desired in the chamber.
- the orifices located on the outer part are offset in an angular manner when compared to the orifices located on the inner part. The orifices are thus not located on the same longitudinal axis of the flange; this offset therefore allows for the cooling fluid to be forced to flow in rotation around the longitudinal axis of the flange.
- the separating plate comprises notches which allow for circulation of the cooling fluid between an outer cylindrical space located on the side of the outer part and an inner cylindrical space located on the side of the inner part. These notches allow both to regulate the flow rate of the cooling fluid in the chamber, as well as pressure losses and to provide a cooling path that bypasses the chamber.

the chamber is delineated by two semi-disks, between which extends a semi-circular bottom in such a manner so as to at least delineate an accommodation that is complementary to at least one winding overhang, the flange comprises a single circular accommodation intended to receive a plurality of winding overhangs. This embodiment is particularly well-adapted in the event of distributed winding.

the flange comprises a band which encircles an inner part of the flange and at least in part delineates the chamber, the band comprises radial protrusions delineating a cavity and having at least one hole, at least one protrusion extends into the accommodation and delineates the chamber, the chamber being in communication with the cavity through the hole.

The invention furthermore relates to an electrical machine comprising:

a plurality of coils, a stator comprising a lamination stack upon which the coils are installed, the plurality of coils having winding overhangs, each winding overhang protruding beyond the lamination stack in a longitudinal direction, a mobile rotor rotating on the inside of the stator by means of a shaft, characterized in that it comprises at least one flange as previously defined. An electrical machine is thus provided which has improved cooling and guaranteeing an increase in performance with a reduced footprint and a lesser weight.

According to various features of the electrical machine that are taken alone or in combination, it can be foreseen that:

the electrical machine comprises a plurality of circulation streams for the cooling fluid formed on an outside face of the stator. The fluid flow is sealed relative to the stator, so that the fluid does not pass inside the stator. These circulation streams allow the cooling fluid to circulate along the outer peripheral face of the stator. Preferably, the stator comprises fins on its outer face.

the chamber of the flange is sealed with respect to the winding overhangs. Thus, when the flange is mounted on the electrical machine, the cooling fluid entering the chamber does not come into direct contact with the winding overhangs.

the electrical machine comprises a first flange and a second flange arranged on either side of the stator, the flanges being symmetrical in relation to a plane of symmetry that passes through the middle of the stator. In this manner, the chambers formed inside the first flange are likewise symmetrical to the chambers formed inside the second flange in relation to the plane of symmetry passing through the middle of the stator. It is the same for the orifices that allow an inlet and outlet of the cooling fluid.

the electrical machine comprises a jacket inside of which the stator and at least one flange are arranged, the jacket comprising at least one inlet of cooling fluid and at least one outlet of cooling fluid, each stator lamination comprises at least one opening in such a way as to form a cooling fluid duct above and/or along the coils, said duct extending the full length of the stator along a longitudinal axis of the electrical machine, the cooling fluid duct above the coils and/or the cooling fluid duct along the coils communicates with the chamber formed on the inside of at least one flange, the electrical machine is an electric motor intended to ensure the movement of a vehicle, in particular an automobile.

DESCRIPTION OF THE FIGURES

Other features, details and advantages of the invention will emerge more clearly upon reading the description, provided hereinafter for information purposes only, in conjunction with the drawings in which.

It should be noted that the Figures show the invention in a detailed manner in order to be able to implement the invention, with said Figures being able to better define the invention, where appropriate. All reference numbers remain the same from one Figure to the other.

DETAILED DESCRIPTION

In the description that follows, relative concepts such as "inner" and "outer" are defined in relation to a longitudinal axis L of the flange and/or of the electrical machine. The concept of "inner" with reference to this longitudinal axis means that the element being considered is located or is moving towards the inside of the electrical machine, whereas the concept of "outer" with reference to this longitudinal axis means that the element being considered is located or is moving towards the outside of the electrical machine. The relative concepts such as "inside," "outside" are defined in relation to a radius R of the flange and/or of the electrical machine, the concept of "inside" approaching the center of the flange and/or of the electrical machine and the concept of "outside" moving away from the center, this center, for example, being defined by the longitudinal axis L. In the same way, the relative concepts of "above" and "below" must be understood in relation to the winding overhangs. More specifically the concept of "above" corresponds to the area that is the furthest away from the longitudinal axis L, and the concept of "below" corresponds to the area that is the closest to the longitudinal axis L, in relation to the winding overhang under consideration.

Figure 1:
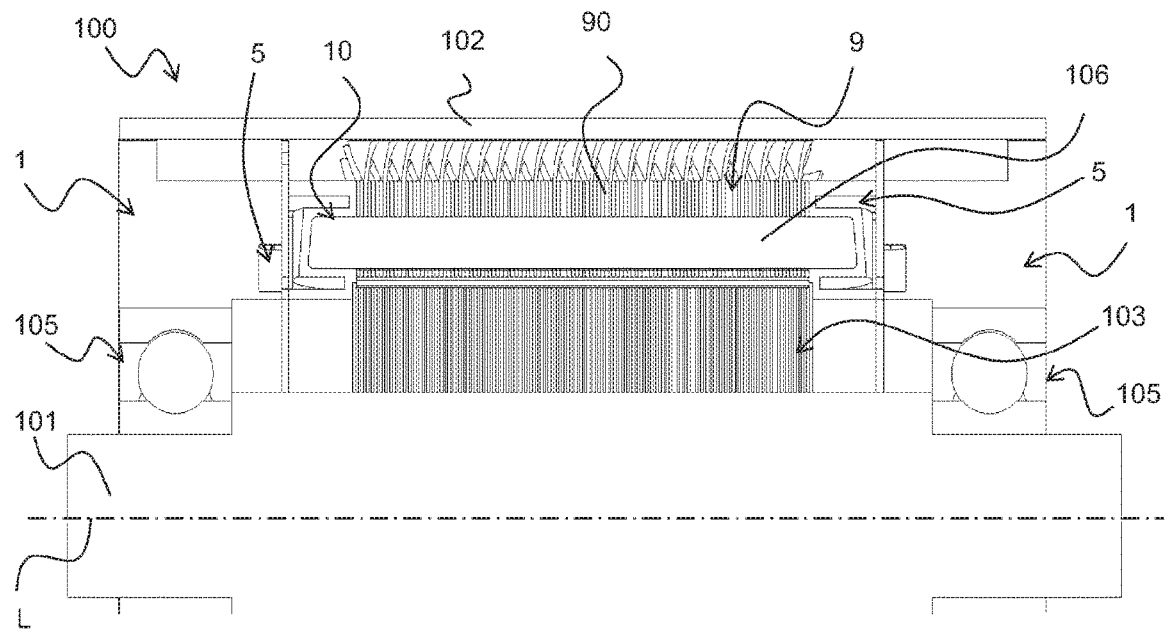
FIG. 1 is a cross-sectional half view of an electrical machine.

FIG. 1 shows an electrical machine 100 comprising a stator 9, as well as a shaft 101 rotationally driving a rotor 103. The electrical machine 100 comprises windings forming a plurality of coils 106 having winding overhangs 10. The stator 9 is produced by a lamination stack 90 upon which the coils 106 are installed, each winding overhang 10 protruding longitudinally beyond the lamination stack 90. Here it is considered that a winding overhang 10 is the part of a coil which protrudes beyond the lamination stack 90, said part being able to take the shape of a 180° elbow. A coil 106 can thereby comprise two winding overhangs 10, each formed at a longitudinal end of the coil being considered.

The electrical machine 100 comprises two flanges 1 arranged at two ends of the stator 9. Each flange 1 enables the retention of the shaft 101, rotationally driving the rotor 103 through a rotating bearing 105, such as for example, ball bearings. More specifically, as is visible in the Figures, each flange 1 comprises a receiving area intended or configured to receive the rotating bearing 105. The electrical machine 100 preferably comprises a jacket 102 covering the flanges 1 and the stator 9, along the longitudinal axis L. Flange 1, in contrast with jacket 102, does not cover the laminations 90 of the stator 9 of the electrical machine 100, in the longitudinal axis L.

FIGS. 2 to 11 show a flange 1 for an electrical machine 100 configured to at least partially cover one or more winding overhangs 10 of the electrical machine 100. A chamber 5 is formed on the inside of flange 1, which is to say that chamber 5 is entirely delineated by the constituent material of flange 1, whether the latter is made of one or multiple pieces, and by inlet and outlet orifices of chamber 5. More specifically, it is here understood that chamber 5 is a closed volume communicating with the outside of flange 1 through the orifices.

The following description touches upon technical features of a single flange; it is however clear that these technical features can also be transferred to a plurality of flanges 1 which equip the electrical machine 100, in particular at each longitudinal end of the same.

Chamber 5 is delineated by walls of flange 1 and follows a shape that is complementary to the shape of the winding overhangs 10, thereby allowing a cooling that is as close as possible to the winding overhangs 10. When speaking of a complementary shape, it is understood that the shape of chamber 5 and its walls at least partially follow the shape lines which are followed by the winding overhangs 10.

In the various embodiments of flange 1 described hereinafter, the shape that is complementary to the winding overhangs 10 presents itself, for example, in the shape of a U-shaped section 50, such a U-shaped section defining chamber 5. This U-shaped section 50 is visible by means of a cross-section following the longitudinal axis L of flange 1 and is located on the inner side of flange 1, which is to say the side that is closest to the winding overhangs 10. The U-shaped section 50 frames the winding overhangs 10 above, below and on the outer part of the winding overhangs 10. More specifically, the walls forming the U-shaped section 50 are intended to come into contact with at least three faces of the winding overhangs 10. For this purpose, the U-shaped section 50 has a first part 57 intended to pass above the winding overhang 10, a second part 58 intended to pass below the winding overhang 10 and a third part 59 that extends according to the radial axis R of flange 1. The third part 59 enables the linking of the first part 57, passing above the winding overhangs 10, to the second part 58 passing below the winding overhangs 10. Obviously, as a shape that is complementary to the winding overhangs 10, chamber 5 could comprise any shape other than a U-shaped section 50; for example, chamber 5 could comprise a T-shaped section towards the outside or towards the inside of flange 1, or even an I-shaped section.

The chamber 5 is configured to receive and/or channel a cooling fluid. The chamber 5 is sealed with regards to the winding overhangs 10 in such a manner that when flange 1 is mounted on the electrical machine 100, the cooling fluid in chamber 5 does not penetrate into an area of the electrical machine 100 where the rotor 103 extends. Thereby, the cooling fluid does not come into direct contact with the winding overhangs 10, which facilitates the design and the manufacture of such an electrical machine 100. The cooling fluid is, for example, antifreeze liquid or oil. As a variant, the cooling fluid could be a gas or a gaseous composition such as air and any other gas mixture.

In the various embodiments of flange 1 described hereinafter, flange 1 is produced out of at least three parts, as will clearly appear in FIG. 3 or 8. In the framework of the manufacture of flange 1, these parts are parts that are applied, in particular, one against the other. When flange 1 is installed on the electrical machine 100, the same comprises an outer part 2 that is exposed to the outside of the electrical machine 100 and an inner part 4 exposed to the inside of the electrical machine 100, in accordance with the frame of reference presented here above. The outer part 2 and inner part 4 are separated the one from the other by a separating plate 3, these two parts being plated on each side of the separating plate 3.

The outer part 2 of flange 1 has a cylindrical shape. The outer part 2 can likewise be classified as an outer band of flange 1. This outer part 2 is delineated by an outer face 22, an inner face 24 as well as an outside cylindrical face 25 and an inside cylindrical face 26. The outer part 2 likewise comprises a collar 27 which extends in the axial continuation of the inside cylindrical face 26, as well as a shoulder area 28 offering a support surface to the jacket 102 of the electrical machine 100. The outer part 2 comprises a kerf that follows a circular guideline that leads to the inner face 24. This kerf forms a first part of chamber 5, hereinafter referred to as the outer chamber 52. The outer part 2 likewise comprises multiple open recesses 29 on the inner face 24. The recesses 29 extend radially and are uniformly distributed in an angular manner around the whole circumference of the outer part 2. These recesses 29 allow for a circulation of the cooling fluid between the outside cylindrical face 25 and the outer chamber 52 through the first orifices 72 located on the outer part 2.

Thereby, and as is visible in the Figures, the outer part 2 of flange 1 comprises first orifices 72 formed on the outside cylindrical face 25 and leading into chamber 5. More specifically, the first orifices 72 lead into the first part of chamber 5, the so-called outer chamber 52.

The inner part 4 of flange 1 is produced by a cylindrical-shaped band. The inner part 4 is delineated by an outer face 42 and an inner face 44, as well as an outside cylindrical face 45 and an inside cylindrical face 46, as per the frame of reference previously elaborated on. The inner part 4 also comprises at least one kerf following a circular guideline leading to the outer face 42. In the embodiment represented in the Figures, the inner part 4 comprises two kerfs. These two kerfs form a second part of chamber 5, hereinafter referred to as inner chamber 54. A U-shaped wall of inner part 4 has a dual role: on the one hand, it allows for the inner chamber 54 to be closed and thereby contain the cooling fluid, and on the other hand, it allows for the definition of at least one accommodation 43 intended to receive the winding overhangs 10, in particular in order to cooperate in a complementary manner with the shape of the concerned winding overhang 10, and more specifically by being in contact with the same. The U-shaped wall of inner part 4 thereby on inner face 44 has the shape that is complementary to the shape of the winding overhangs 10.

More specifically, the wall that delineates at least in part chamber 5 and is intended to be in contact with the winding overhangs 10 is continuous. This means that said wall is not interrupted by orifices which would lead into the receiving area of the winding overhangs 10. This ensures the seal of chamber 5 as regards the winding overhangs 10.

The inner part 4 furthermore comprises at least one second orifice 74. Preferably, this second orifice 74 leads to the outer cylindrical face 45 of inner part 4. This or these second orifice(s) 74 is/are, for example, oblong-shaped and aligned along the longitudinal axis L. The second orifices 74 of inner part 4 enable, for example, a circulation of the cooling fluid between the inner chamber 54 and the outside cylindrical face 45.

Thereby, and as is visible in the Figures, the inner part 4 of flange 1 comprises at least a second orifice 74 leading into chamber 5. More specifically, the second orifice 74 leads into the second part of chamber 5, called inner chamber 54. This second orifice 74 can be formed by means of the outer cylindrical face 45.

According to a variant, at least one second orifice 74 is formed on an inner face 44 of inner part 4 of flange 1, the inner face 44 extending radially in relation to flange 1. This or these second orifice(s) 74 then has/have an axis that is substantially parallel to the longitudinal axis L. Substantially is understood to mean that the manufacturing tolerances are understood to assert parallelism. As a reminder, the inner face 44 is a face that is intended to be located towards the inside of the electrical machine 100, according to the frame of reference presented here above.

Once the inner part 4 and the outer part 2 are assembled, flange 1 is peripherally delineated by a peripheral face 2545 comprising outside cylindrical faces 25, 45 of outer part 2 and of inner part 4.

Thereby, and as is visible in the Figures, the peripheral face 2545 is an outside cylindrical face of flange 1. The peripheral face 2545, or outside cylindrical face of flange 1, therefore comprises first orifices 72 leading into chamber 5. According to the embodiment, the peripheral face 2545, or outside cylindrical face of flange 1, can comprise at least one second orifice 74 leading into chamber 5.

In a more general manner, the orifices 72, 74, regardless of if they are first or second orifices, are formed in the walls of flange 1 that are distinct from the walls oriented towards the winding overhangs 10 or the walls in contact with the winding overhangs 10.

Moreover, there are the same number of the first orifices 72 or the second orifices 74 as there are of winding overhangs 10 intended to cooperate with one of the flanges 1.

The separating plate 3 extends radially in relation to the longitudinal axis L of flange 1 so as to form a disk. The separating plate 3 radially protrudes beyond the peripheral face 2545 and enables the definition of two cylindrical spaces. A first cylindrical space 62 is radially delineated between the outside cylindrical face 25 of outer part 2 and jacket 102 and is longitudinally defined between the separating plate 3 and the shoulder area 28, the first cylindrical space 62 therefore being able to be called outer space. A second cylindrical space 64 is radially defined between the outside cylindrical face 45 of inner part 4 and jacket 102 and is longitudinally defined between the separating plate 3 and the laminations 90 of the stator 9, the second cylindrical space 64 therefore being able to be called inner space. Notches 32 are made in the separating plate 3 to enable circulation of the cooling fluid between the two cylindrical spaces 62, 64. Said notches 32 enable both the regulation of the flow rate of the cooling fluid in chamber 5 and to provide a cooling path that skirts chamber 5.

More specifically, the separating plate 3 preferably extends to the jacket 102, in such a way that the circulation of the cooling fluid between the two cylindrical spaces 62, 64 is solely possible through the presence of these notches 32 and of chamber 5. According to an alternative, the separating plate 3 does not extend to the jacket 102, in such a way that a crown section located above the separating plate 3 likewise permits a circulation of the cooling fluid between the two cylindrical spaces 62, 64. In this case, the separating plate 3 can be devoid of notches 32.

The separating plate 3 likewise allows for the division of chamber 5 into the outer chamber 52 located in the outer part 2 of flange 1 and into the inner chamber 54 located in the inner part 4 of flange 1. The inner chamber 54 is as close as can be to the winding overhangs and has a shape that is complementary to the winding overhangs 10.

It can be seen that the separating plate 3 comprises at least one slit 31 enabling circulation of the cooling fluid between the outer chamber 52 and the inner chamber 54. Advantageously, the separating plate 3 comprises a plurality of slits 31 arranged in a circular manner around and inside an edge 36 which delineates the separating plate 3. Whereas the notches 32 are formed in an outside edge 35 of the separating plate 3, it is noted that a plurality of slits 31 is closer to the inside edge 36 than to the outside edge 35.

To improve the cooling ability of the flange, it is noted that the first orifices 72 of the outer part 2 and the second orifices 74 of inner part 4 are offset, the ones from the others, in an angular manner, thereby forming circulation of the cooling fluid in rotation around the longitudinal axis L. Here, the orifices 72, 74 of the outer part 2 and inner part 4 lead out onto the peripheral face 2545 of flange 1. Thereby, chamber 5 comprises multiple inlets and multiple outlets as a function of the desired flow rate of cooling fluid in chamber 5.

Moreover, the notches 32 of the separating plate 3 are angularly offset in relation to the first orifices 72 and to the second orifices 74 to avoid disruption of the circulation of the cooling fluid passing through these orifices 72, 74.

Figure 2:
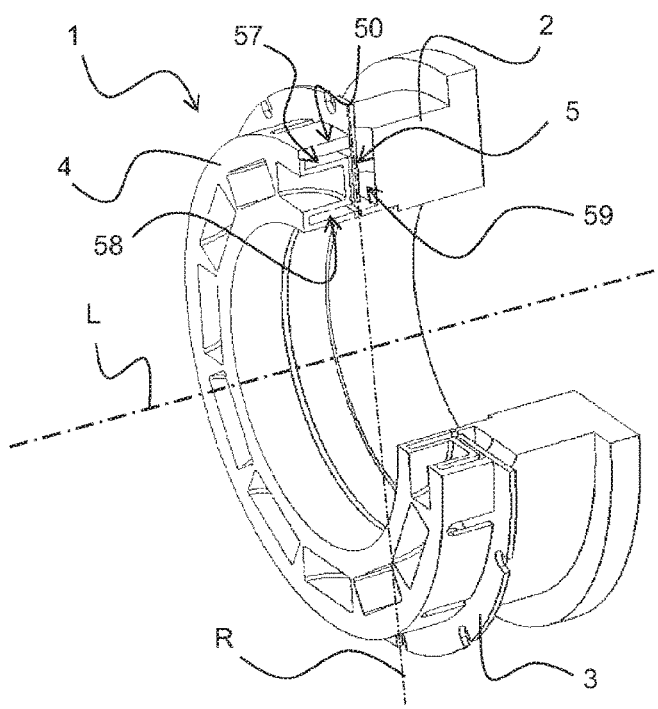
FIG. 2 is a perspective and partial cross-sectional view of a flange according to a first embodiment thereof.
Figure 3:
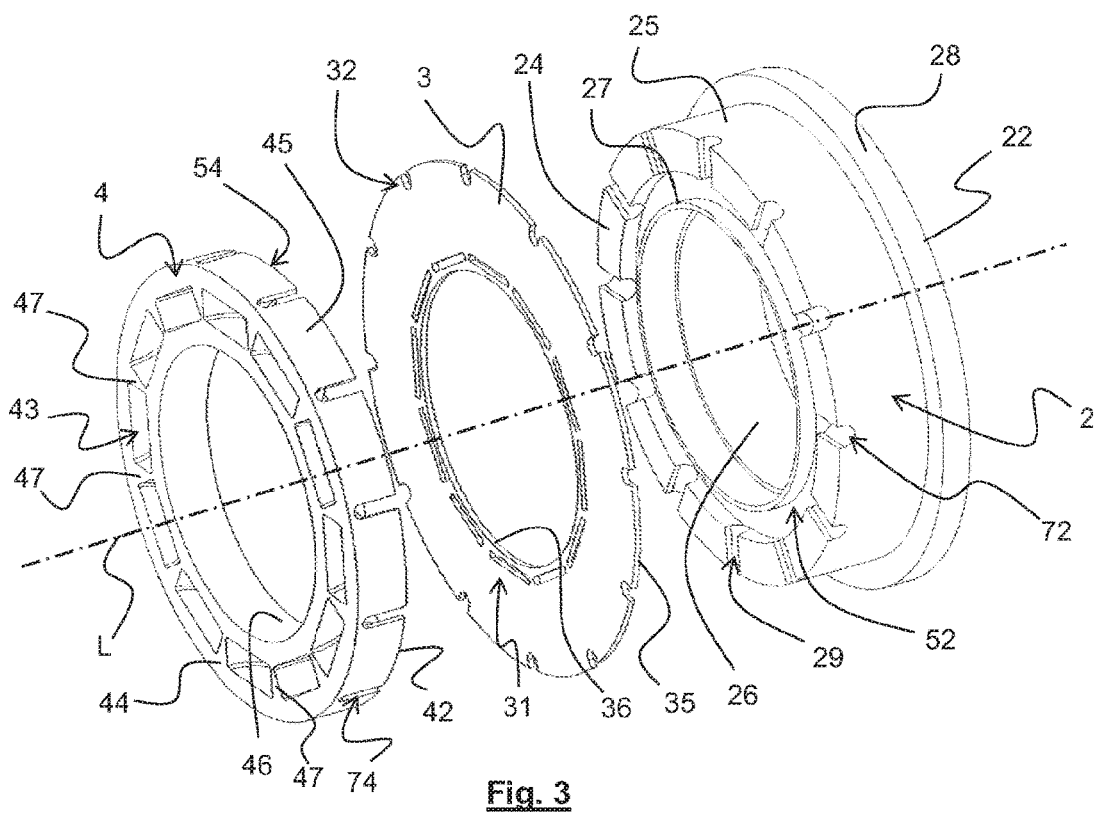
FIG. 3 is an exploded view of the flange according to the first embodiment.
Figure 4:
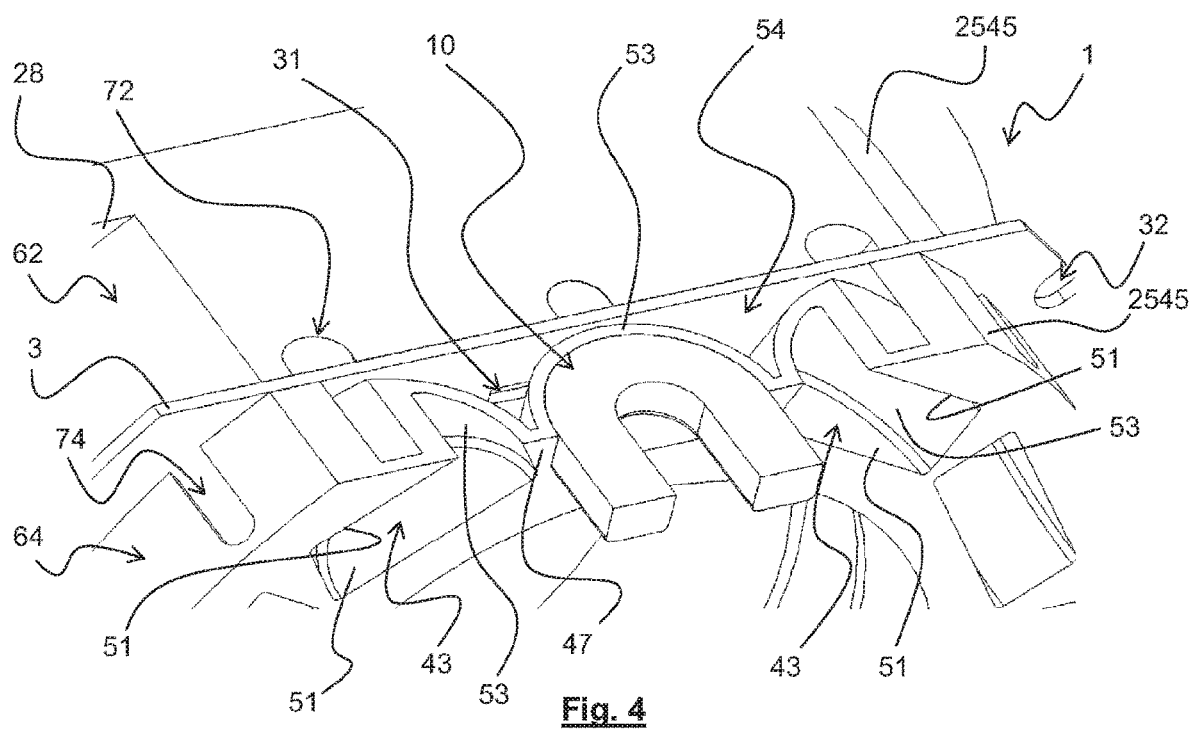
FIG. 4 is a partial cross-sectional view of a flange of the electrical machine seen from a ¾ view, showing a collaboration between a chamber and a winding overhang.

According to a first embodiment of the flange illustrated by FIGS. 2 to 4, the inner part 4 of flange 1 has a plurality of accommodations 43 which are open on the inner face 44. These accommodations 43 are separated from each other by walls 47 which extend radially. These radial walls 47 are uniformly distributed around the circumference of inner part 4. It is here understood that flange 1 according to this embodiment comprises accommodations 43, each of which receive at least one winding overhang 10, and preferably a single winding overhang 10. Moreover, as shown in FIGS. 2 to 4, each of the second orifices 74 is located on a same radius of flange 1 as the radial walls 47.

In a longitudinal cross-section, the accommodation 43 has a U-shaped profile that corresponds to the previously mentioned U-shaped section 50. The accommodation 43 is delineated by two semi-disks 51 and a semi-circular bottom 53 which extends between the two semi-disks 51, thereby forming a cavity having a shape that is complementary to a winding overhang 10. The two semi-disks 51 enable the inner chamber 54 to expand on the two lateral sides of a winding overhang 10. Thereby, the inner part 4, and more specifically the accommodations 43 of the inner face 44, longitudinally, radially and peripherally mold around the shape of each winding overhang 10, in such a manner as to envelop each winding overhang 10 on all of its faces.

This first embodiment is particularly well-adapted to electrical machines with individual coil winding, which is to say coil winding entailing winding around a single tooth of the laminations 90 forming the stator 9. In such a case, each coil 106 comprises two winding overhangs 10, and the winding overhangs 10 are individual and adjacent each other.

Figure 5:
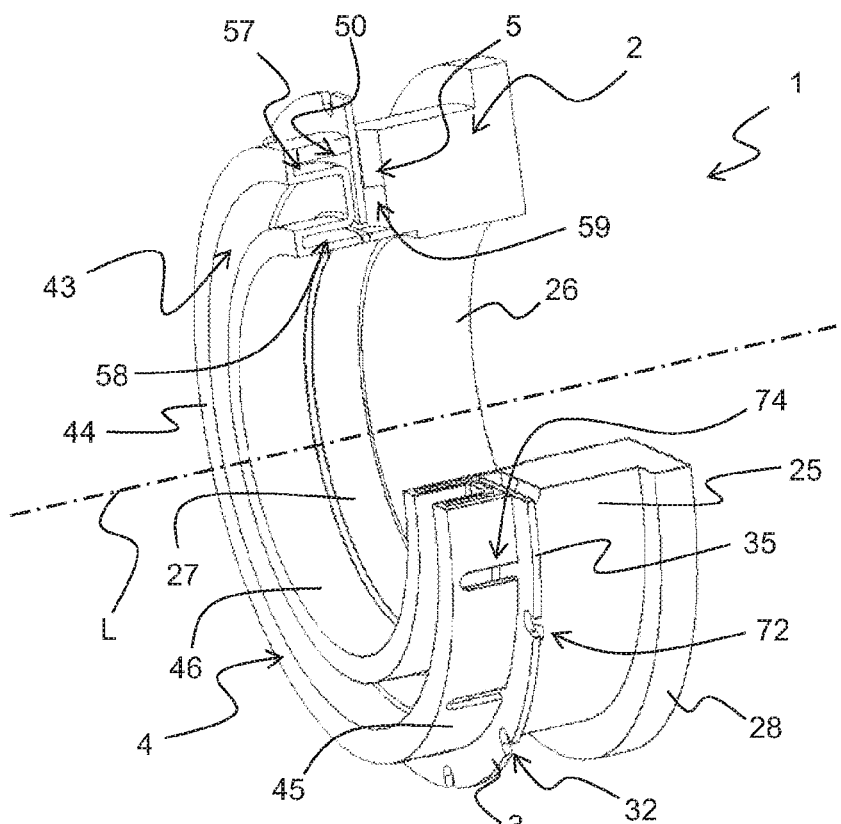
FIG. 5 is a perspective and partial cross-sectional view of a flange according to a second embodiment thereof.
Figure 6:
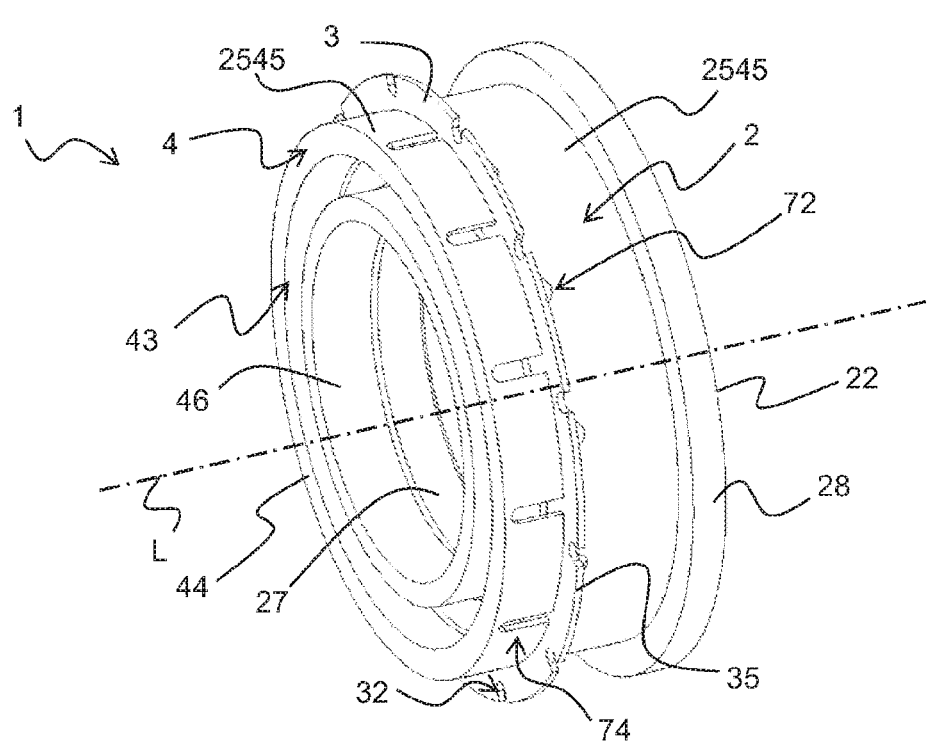
FIG. 6 is a perspective view of the flange of FIG. 5.

According to a second embodiment of flange 1 illustrated by FIGS. 5 and 6, the inner part 4 of flange 1 has a single accommodation 43 which extends peripherally along the entire circumference of the inner part 4. In other words, the accommodation 43 here forms a continuous ring delineated above by the first part 57 of the U-shaped section 50 of chamber 5, below by the second part 58 of the U-shaped section 50 of chamber 5 and, at the base of the accommodation 43, by the third part 59 of the U-shaped section 50 of chamber 5. The outer part 2 and the separating plate 3 are identical to those of the first embodiment.

This second embodiment of the flange is particularly well-adapted when the coil winding of the electrical machine is distributed, which is to say a case in which a coil consists of a plurality of windings formed on multiple teeth of the laminations 90 forming the stator 9. This effectively modifies the shape of the winding overhangs 10 in such a manner that the same intertwine and then extend over an angular section that is greater than in the framework of an individual coil winding.

In the embodiment illustrated in FIGS. 5 and 6, there are no radial walls 47 on the inner face 44 which separate the accommodations 43. More specifically, the inner part 4 thereby solely comprises the U-shaped, T-shaped or I-shaped section 50.

This second embodiment offers an advantage as regards the installation of flange 1 on the electrical machine 100, since it is not necessary to pair up the position of flange 1 in relation to the winding overhangs 10. The installation of flange 1 of the second embodiment can therefore be carried out by a simple translation on the stator 9 which can have distributed coil winding.

Figure 7:
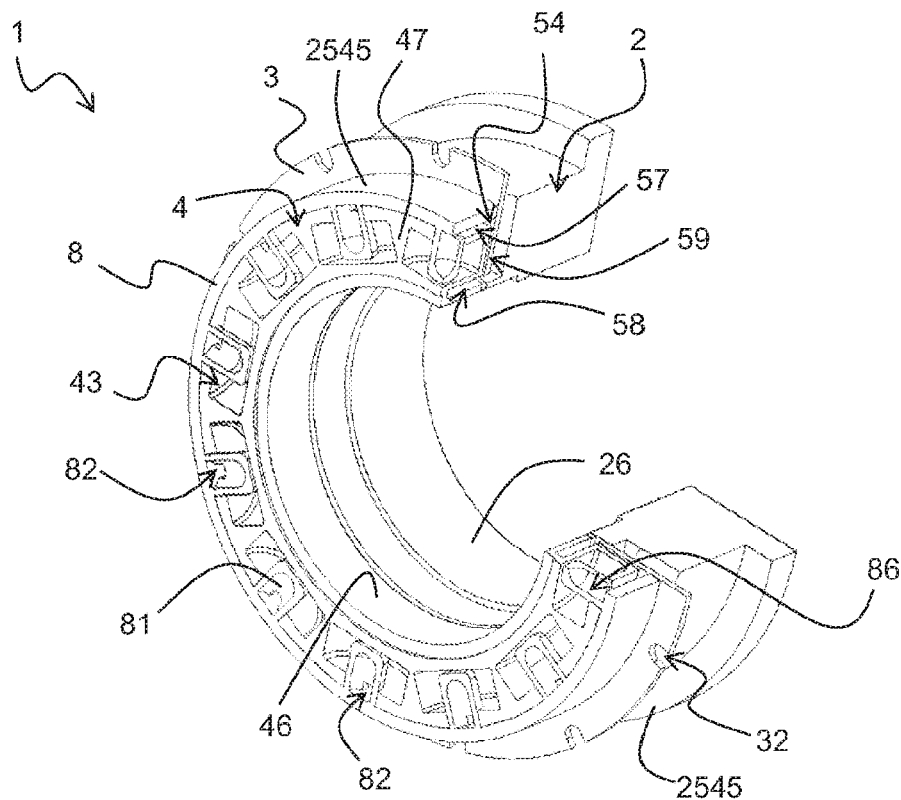
FIG. 7 is a perspective and partial cross-sectional view of a flange according to a third embodiment thereof.
Figure 8:
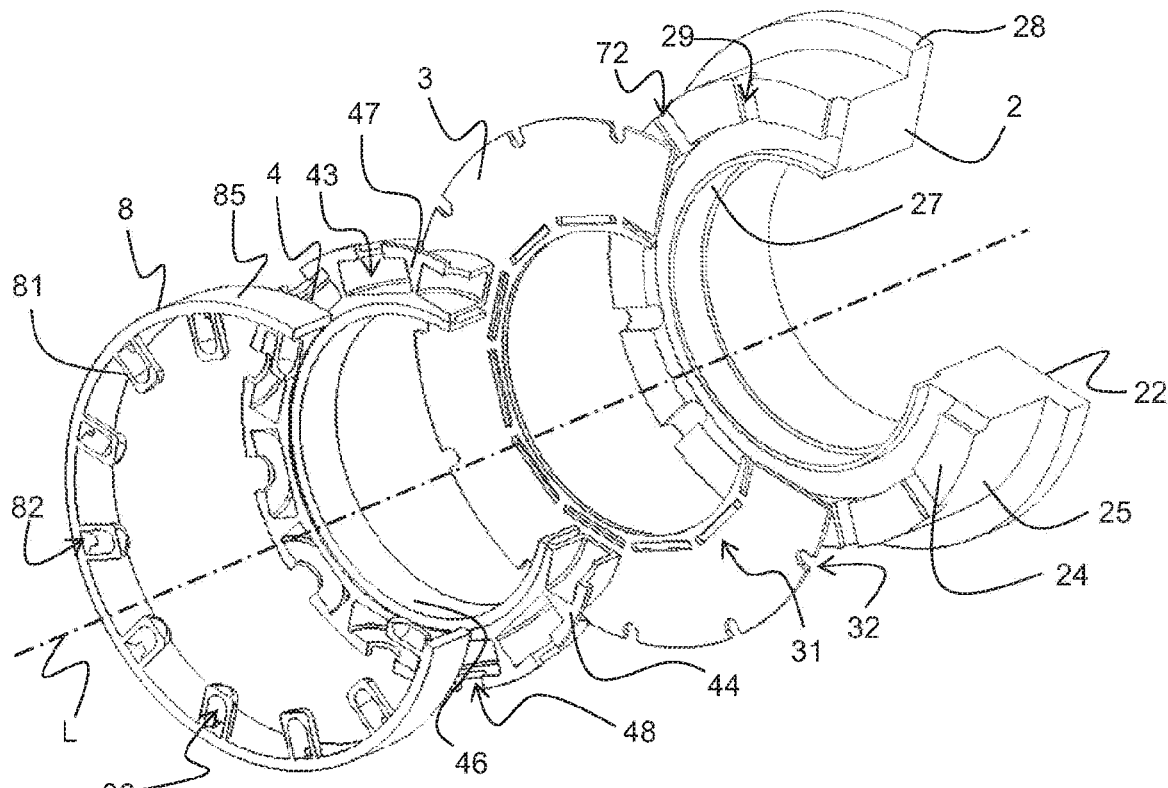
FIG. 8 is an exploded and partial cross-sectional view of the flange of FIG. 7.

According to a third embodiment of flange 1 illustrated by FIGS. 7 and 8, flange 1 comprises a fourth piece called a ring 8. The outer part 2 and the separating plate 3 are identical to those of the first embodiment and of the second embodiment, and reference will be made to the corresponding description to know the technical features thereof.

The ring 8 is cylindrical in shape and has an outside cylindrical face 85 intended to form the outside cylindrical face of inner part 4. This outside cylindrical face 85 delineates the outside part 57 of the U-shaped section 50 of chamber 5. In a general manner, ring 8 at least partially encircles the inner part 4 and is involved in the delineation of chamber 5 of flange 1. In the embodiment example represented in the Figures, the outside cylindrical face 85 is devoid of second orifices 74. However, as an alternative, the ring 8 can comprise second orifices 74 that lead to the peripheral face 2545 of flange 1 and more specifically to the outside cylindrical face 85 of ring 8.

The ring 8 comprises protrusions 81 which extend radially towards the inside of flange 1, which is to say that they extend towards the center of flange 1, represented here by the longitudinal axis L. The inner part 4 has open recesses 48 on its inner face 44 which are intended to receive the protrusions 81. In the embodiment represented in FIGS. 7 and 8, the inner part 4 comprises radial walls 47 on its inner face 44 forming a plurality of accommodations 43, like in the first embodiment of flange 1. Of course, it is possible that the inner part 4 provided with recesses 48 only comprises a single circular accommodation 43, as in the second embodiment of the flange.

The protrusion 81 improves heat exchange by increasing the contact surface between the cooling fluid, through flange 1, and the winding overhang(s) 10. This protrusion is arranged to become lodged in an empty part of the winding overhang 10, the part being the area around which the wires of the coil 106 are curved to form the winding overhang 10 in a 180° elbow shape. In a cross-sectional view, this protrusion 81 therefore has a semi-circular profile, closed at its distal end and open to chamber 5 at its junction with the outside cylindrical face 85 of band 8. These protrusions 81 therefore form fingers oriented towards the center of flange 1. Moreover, these fingers protect the wires of the winding overhangs 10 during the coil winding operation.

This protrusion 81 is hollowed out to allow an outlet or inlet of cooling fluid from chamber 5. It thereby comprises at least one hole 82 enabling the circulation of the cooling fluid between the inner chamber 54 and a hollowed out part 86 of the protrusion 81. It can likewise be noted that each protrusion 81 has an orifice, called a third orifice, similar to the second orifices 74 of chamber 5 allowing an outflow of fluid from the hollowed out part 86.

Figure 9:
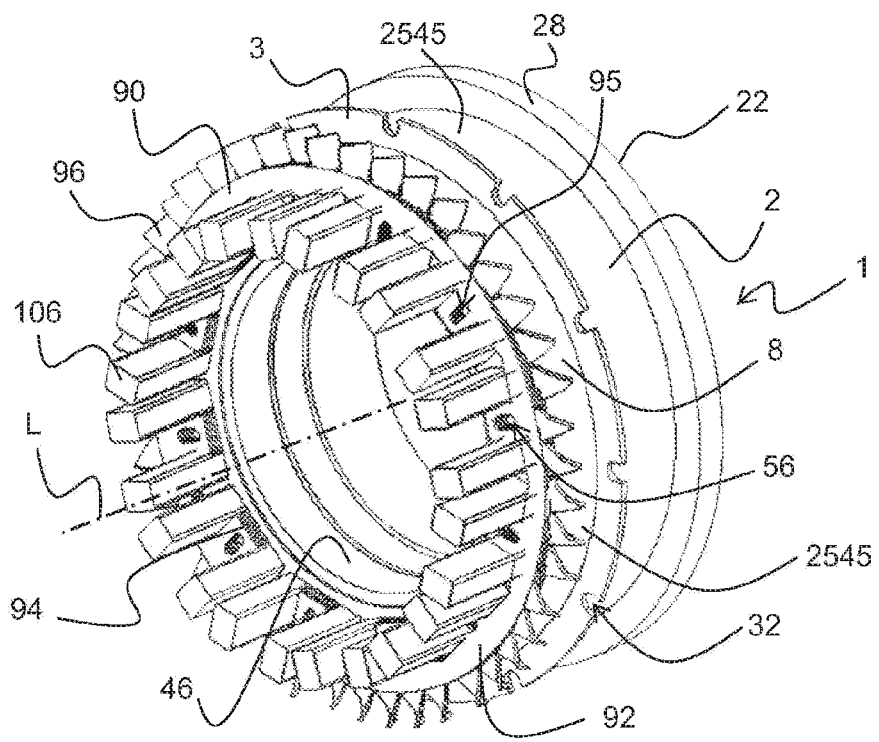
FIG. 9 is a perspective view of the flange of FIG. 8 cooperating with winding overhangs and laminations of the stator.
Figure 10:
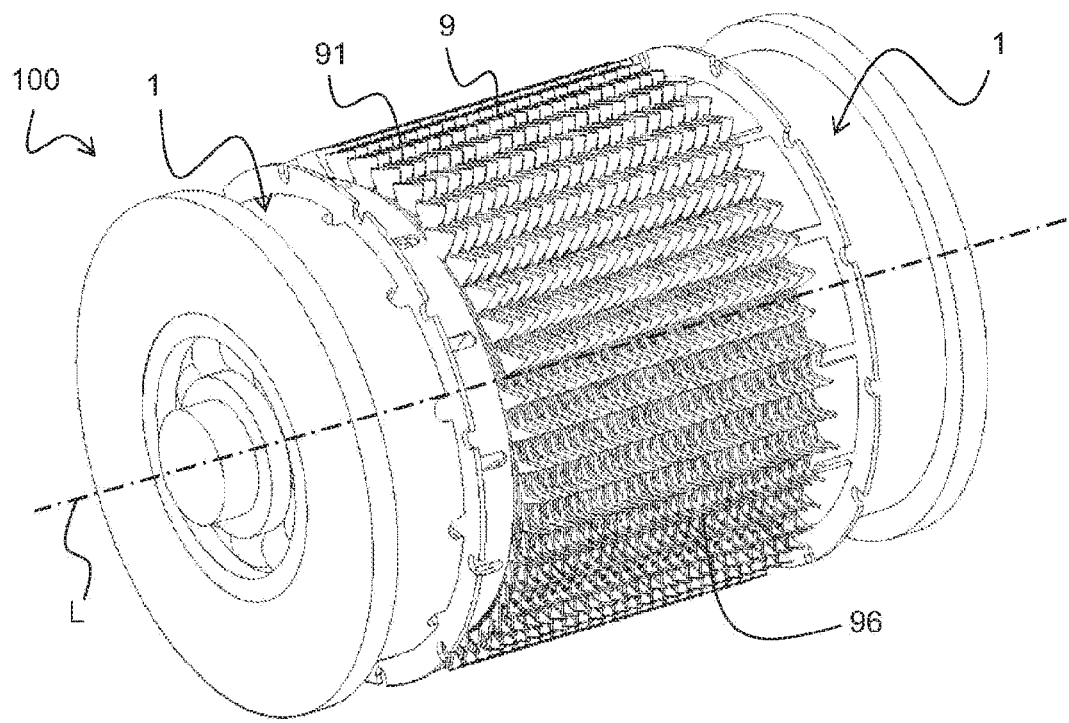
FIG. 10 is a perspective view of an electrical machine, without a jacket.

Moreover, as is visible from FIGS. 9 and 10 illustrating the flange 1 according to the third embodiment and its cooperation with the winding overhangs 10 as well as with the laminations 90 of the stator 9, each hollowed out part 86, and more specifically the third orifice, communicates with the openings 95 formed in the laminations 90 of the stator 9. These openings 95 are formed in the laminations 95 to create at least one duct 56 longitudinally passing through the stator. Thereby, on top of cooling the winding overhangs 10, this third embodiment of flange 1 offers the possibility to cool the electrical machine 100 all along the stator 9, by supplying the longitudinal ducts 56 with cooling fluid. A coil 106 is therefore the result of a first winding portion wound around a protrusion 81 thereby forming a winding overhang 10 combined with a second winding portion wound around a tooth 94 formed by the lamination stack 90 of the stator 9.

In this third embodiment of flange 1, the laminations 90 of the stator 9 support themselves on the band 8. The winding overhangs 10 are then located in the accommodation(s) 43, based upon the embodiment of the coil winding.

Each lamination 90 of the stator 9 has at least one opening 95. The opening 95 can, for example, be oblong-shaped. In the embodiment represented in FIG. 9, the opening 95 is made in each of the teeth 94 of the lamination 90, thereby giving form to the duct 56 for cooling fluid all along the stator 9, and more specifically all along the coils 106. According to a variant, the opening 95 can be made on a crown 92 of the lamination 90, therefore allowing the creation of a duct 56 for cooling fluid above the coils 106, the duct 56 always extending all along the stator 9. The opening 95 carried out on the crown 92 can, for example, be located in the same radial axis as a tooth 94. According to another variant, each lamination 90 of the stator 9 can simultaneously comprise openings 95 in each tooth 94 and openings 95 in the crown 92.

No matter what the variant, the duct 56 for cooling fluid formed above or all along the coils 106 communicates with chamber 5 formed inside of flange 1 through the band 8 and its holes 82.

The electrical machine 100 is represented in a perspective view in FIG. 10, without the jacket 102 which encircles the components of this electrical machine 100. The stator 9 comprises an outside face 91 along which a plurality of circulation streams of cooling fluid is formed. These circulation streams are sealed to avoid any introduction of cooling fluid inside the stator 9. According to one example, each lamination 90 of the stator 9 comprises at least one fin 96 extending radially towards the outside of the outside face 91. In this case, the circulation streams are laid out between the fins 96. These fins 96 improve the cooling of the laminations 90 due to their twisted shape.

Figure 11:
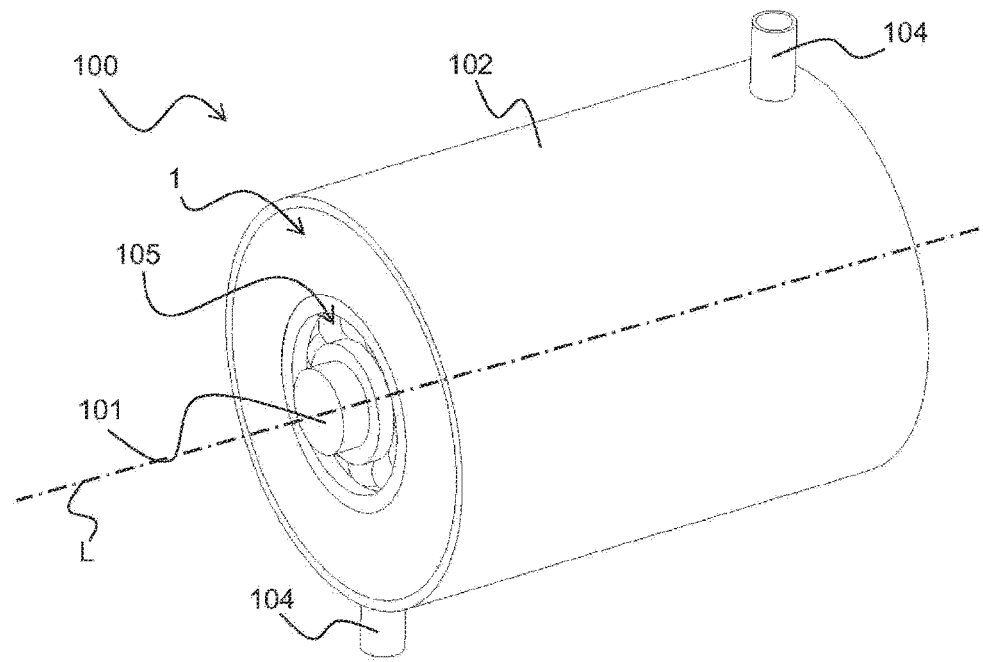
FIG. 11 is a perspective view of an electrical machine with a jacket.

The electrical machine 100 is represented with its jacket 102 in FIG. 11. The jacket 102 completely covers the flanges 1 and the stator 9 while at the same time leaving the shaft 101 of the rotor free, held in rotation in each flange 1 by the rotating bearings 105. The jacket 102 comprises tubes 104 enabling at will an introduction or an evacuation of the cooling fluid to/from the flanges 1, in particular in chamber 5 of the flanges 1. The tubes 104 extend radially towards the outside of the electrical machine 100.

Figure 12:
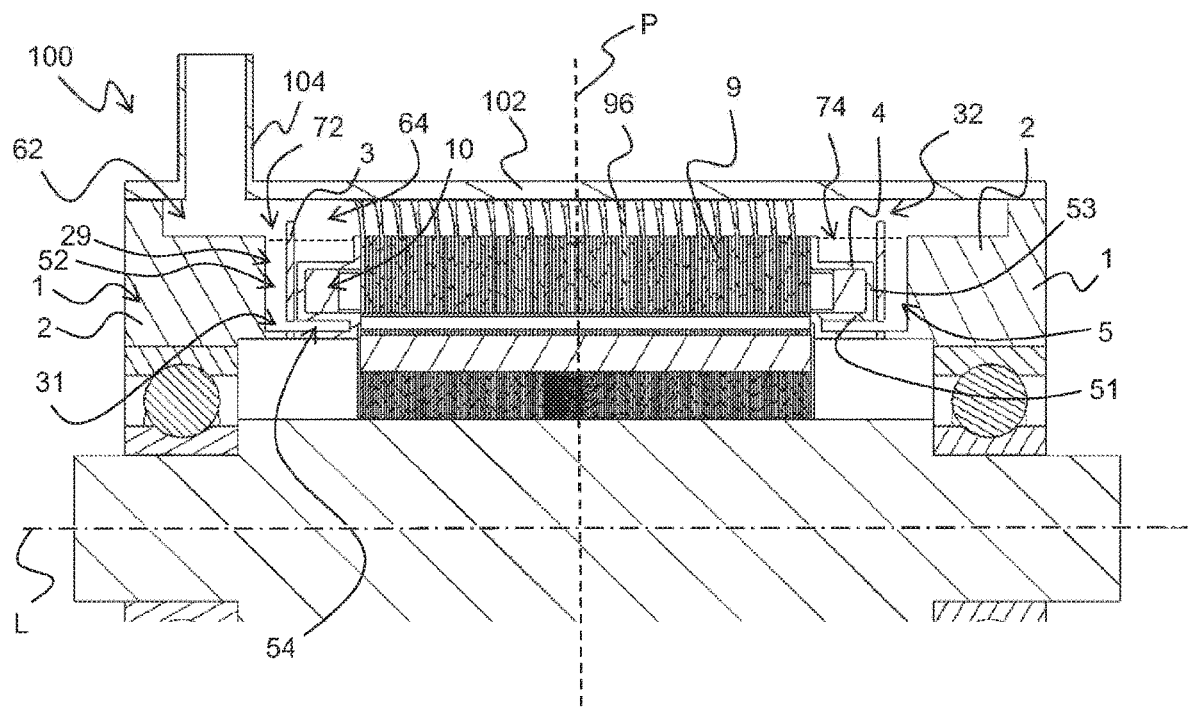
FIG. 12 is a cross-sectional half view of the electrical machine with its jacket and fitted with a flange according to the first embodiment or according to the second embodiment.

FIG. 12 shows a half cross-section of the electrical machine 100 with its jacket 102 comprising two flanges 1 according to the first or the second embodiment. The flanges 1 are laid out longitudinally on both sides of the stator 9. This cross-sectional view shows a tube 104 allowing the introduction or evacuation of cooling fluid to/from one of the two flanges 1, and more specifically to the right of the outer cylindrical space 62. Once the cooling fluid is in the outer cylindrical space 62, it can circulate following multiple paths.

The first path enables the cooling fluid to enter into the outer chamber 52 through one or more of the first orifices 72 and the recesses 29 located on the outer part 2. The cooling fluid then passes towards the inner chamber 54 through the slits 31 formed on the separating plate 3 in order to cool the winding overhangs 10. The cooling fluid then exits by one or more second orifices 74 located on the inner part 4 of flange 1 and finds itself in the inner cylindrical space 64.

The cooling fluid can then make use of the circulation streams formed between the fins 96 of the stator 9 in order to cool the outside peripheral part of the laminations 90 of the stator 9. In this case, the cooling fluid then makes its way towards the second flange 1 which is opposite the first flange 1 and enters directly into the inner cylindrical space 64 of the second flange 1. The cooling fluid then enters into the inner chamber 54 through the second orifices 74 of the inner part 4. The cooling fluid then passes into the outer part 2, in particular into the outer chamber 52 of flange 1 to find itself in the outer cylindrical space 62 of the second flange 1. Then, the cooling fluid makes its way through the second tube 104 to exit the electrical machine 100.

The second path allows the cooling fluid to bypass the chamber 5, which is to say to not enter into chamber 5, and to directly make use of the circulation streams formed between the fins 96 of the stator 9 by passing through the notches 32 of the separating plate 3. The cooling fluid that is present in the outer cylindrical space 62 passes into the inner cylindrical space 64 by circulating through notches 32. Such a layout furthermore allows for compensation of pressure losses of cooling fluid by authorizing a skirting of chamber 5 dedicated to the cooling of the winding overhangs 10.

It will be noted that the two flanges 1 are symmetrical in relation to a plane of symmetry P that is radial to the longitudinal axis L of flange 1 and/or of the electrical machine 100 and passing through the middle of the stator 9. Thereby, chamber 5 which is formed inside the first flange 1 is symmetrical to chamber 5 formed inside the second flange 1, in relationship to the plane of symmetry P. The same also holds true for the orifices 72, 74 allowing the entrance and exit of the cooling fluid in the chambers 5.

It is understood that taking into consideration the nature of the cooling fluid, other paths are possible, in particular by combining at least a part of the first and at least a part of the second path.

FIG. 12 likewise shows the proximity between chamber 5 and the winding overhang 10 since the semi-disks 51 and the semi-circular bottom 53 delineating the U-shaped section of chamber 5 are in contact with the peripheral faces which delineate the winding overhang 10.

Figure 13:
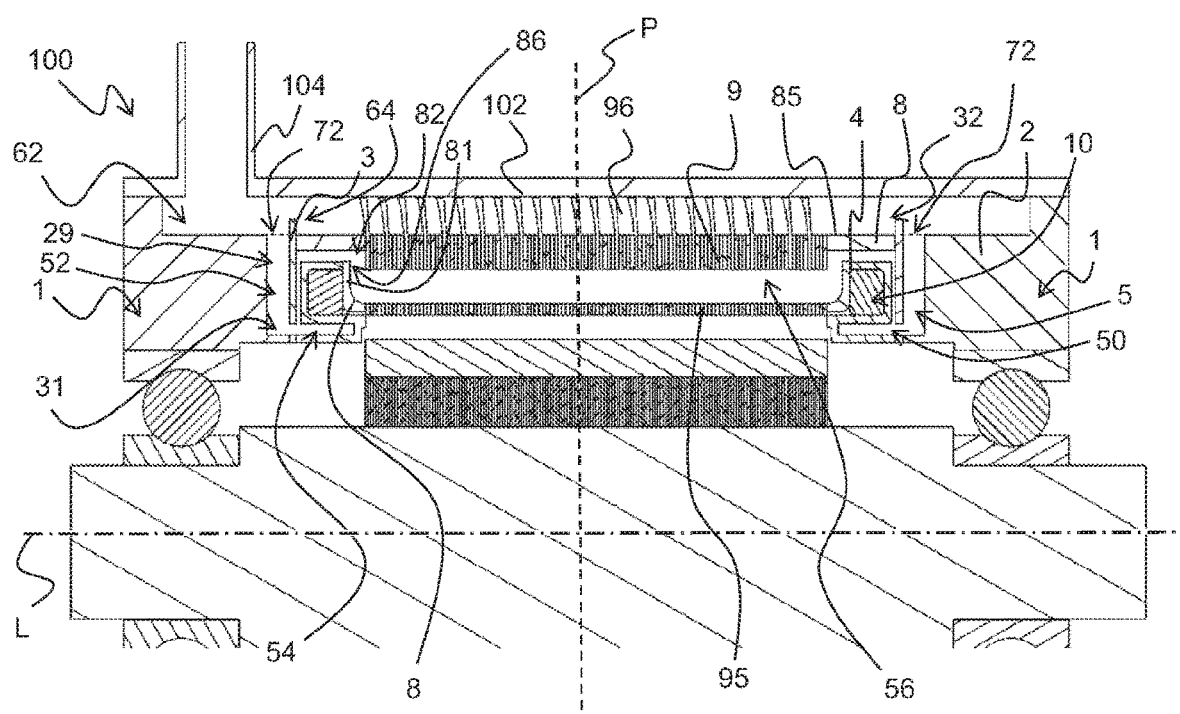
FIG. 13 is a cross-sectional half view of the electrical machine with its jacket and fitted with a flange according to the third embodiment.

FIG. 13 shows a half cross-section of the electrical machine 100 with its jacket 102 comprising two flanges 1 according to the third embodiment. Once the cooling fluid is in the outer cylindrical space 62, it can circulate using the previously described first and second paths when the same is possible; however, it can also use a third path.

The third path starts when the cooling fluid reaches the inner chamber 54 and more specifically when the cooling fluid is located in the upper part 57 of the U-shaped section 50. The cooling fluid then goes along the wall forming the outside cylindrical face 85 of the band 8. Then, the cooling fluid expands along the protrusion 81 and enters into the cavity 86 of the same through the hole 82. The cooling fluid then penetrates into the duct 56 created by the openings 95 of each lamination 90 of the stator 9, leaving the cavity 86 by the third orifice that is assimilable to the second orifice 74 of the chamber 5.

After having longitudinally traversed the stator, the cooling fluid is let out from the stator 9 directly into the band 8, specifically in cavity 86 of the protrusion 81 of the band 8, and in the inner chamber 54 of the second flange 1 opposite the first flange 1. The cooling fluid then passes into the outer part 2 of flange 1 to find itself in the outer cylindrical space 62 of the second flange 1. The cooling fluid lastly takes the second tube 104 to leave the electrical machine 100.

The invention described according to its various embodiments and variants allows important performance to be drawn from an electric propulsion motor of a vehicle, in particular of an automobile, while at the same time maintaining a limited footprint which enables the electric motor to be positioned in the vehicle and to limit its weight. With like footprint or weight, the performance of the electric motor is increased since its cooling is enhanced.

Of course, various modifications can be made by the person skilled in the art to the flange and to the electrical machine which accommodates it, to the extent that the previously defined chamber 5 is produced with and/or has the main features of complementarity in shape with the winding overhang and as described in this document.

In any case, the invention cannot be limited solely to the embodiment that is specifically described in this document, and, in particular, extends to all equivalent means and to any technically functional combination of these means.

The invention claimed is:

1. A flange for an electrical machine configured to at least partially cover winding overhangs that form part of the electrical machine, the flange defining an axis, an axial inner surface, an axial outer surface, and an outer peripheral face; said flange comprising:

a chamber able to receive a cooling fluid, wherein the flange comprises at least one first orifice and at least one second orifice allowing cooling fluid to enter the chamber or allowing the cooling fluid to leave the chamber, said chamber being defined by surfaces which in turn define at least one accommodation sized to receive at least one winding overhang; said accommodation having a profile complementary to that of the at least one winding overhang; and wherein said chamber is configured to be leakproof so as to substantially prevent the cooling fluid from contacting the at least one winding overhang.

2. The flange according to claim 1, wherein the flange comprises a separating plate dividing the flange between an outer part and an inner part, the separating plate comprising an axial inner face facing toward said axial inner surface of said flange and an axial outer face facing toward said axial outer surface of said flange, said axial inner and outer faces of said separating plate extending in a plane that intersects the axis of the flange to divide the chamber between an axial outer chamber located on the outer part and an axial inner chamber located on the inner part.

3. The flange according to claim 2, wherein the separating plate protrudes radially and towards the outside of the flange beyond the outer peripheral face that delineates the outer part and the inner part.

4. The flange according to claim 2, wherein the separating plate comprises at least one slit allowing communication between the outer chamber and the inner chamber.

5. The flange according to claim 2, wherein the at least one second orifice located on the inner part is angularly offset in relation to the at least one first orifice located on the outer part.

6. The flange according to claim 2, wherein the separating plate comprises notches allowing circulation of the cooling fluid between an outer cylindrical space located on the side of the outer part and an inner cylindrical space located on the side of the inner part.

7. The flange according to claim 1, wherein the flange comprises a single circular accommodation intended to receive a plurality of winding overhangs.

8. An electrical machine comprising:
a plurality of coils,
a stator comprising a lamination stack upon which are installed the coils, the plurality of coils having winding overhangs, each winding overhang longitudinally protruding beyond the lamination stack,
a mobile rotor in rotation on the inside of the stator by means of a shaft, and at least one flange according to claim 1.

9. The electrical machine according to claim 8, wherein each lamination of the stator comprises at least one opening so that the stator forms at least one cooling fluid duct above and/or along the coils, the duct extending all along the stator according to a longitudinal axis of the electrical machine.

10. The electrical machine according to claim 9, wherein the cooling fluid duct above the coils and/or the cooling fluid duct along the coils communicates with the chamber formed on the inside of at least one flange.

11. A flange for an electrical machine configured to at least partially cover winding overhangs that form part of the electrical machine, the flange comprising a chamber able to receive a cooling fluid, wherein the flange comprises at least one first orifice and at least one second orifice allowing cooling fluid to enter the chamber or allowing the cooling fluid to leave the chamber, said chamber having a profile complementary to that of at least one winding overhang; wherein the chamber is delineated by two semi-disks between which extends a semi-circular bottom in such a way as to delineate at least one accommodation that complements at least one winding overhang.

12. A flange for an electrical machine configured to at least partially cover winding overhangs that form part of the electrical machine, the flange comprising a chamber able to receive a cooling fluid, wherein the flange comprises at least one first orifice and at least one second orifice allowing cooling fluid to enter the chamber or allowing the cooling fluid to leave the chamber, said chamber having a profile complementary to that of at least one winding overhang, wherein the flange comprises a ring which encircles an inner part of the flange and delineates at least partially the chamber.

13. The flange according to claim 12, wherein the ring comprises radial protrusions delineating a cavity and having at least one hole.

14. The flange according to claim 13, wherein,
the chamber is delineated by two semi-disks between which extends a semi-circular bottom in such a way as to delineate at least one accommodation that complements at least one winding overhang, or
the flange comprises a single circular accommodation intended to receive a plurality of winding overhangs; and
wherein at least one protrusion extends into the accommodation and delineates the chamber, said chamber communicating with the cavity through the hole.

* * * * *